March 11, 1952  F. B. ROLFSON  2,588,882
TEMPERATURE COMPENSATOR FOR CAPACITORS
Filed April 27, 1948  3 Sheets-Sheet 1
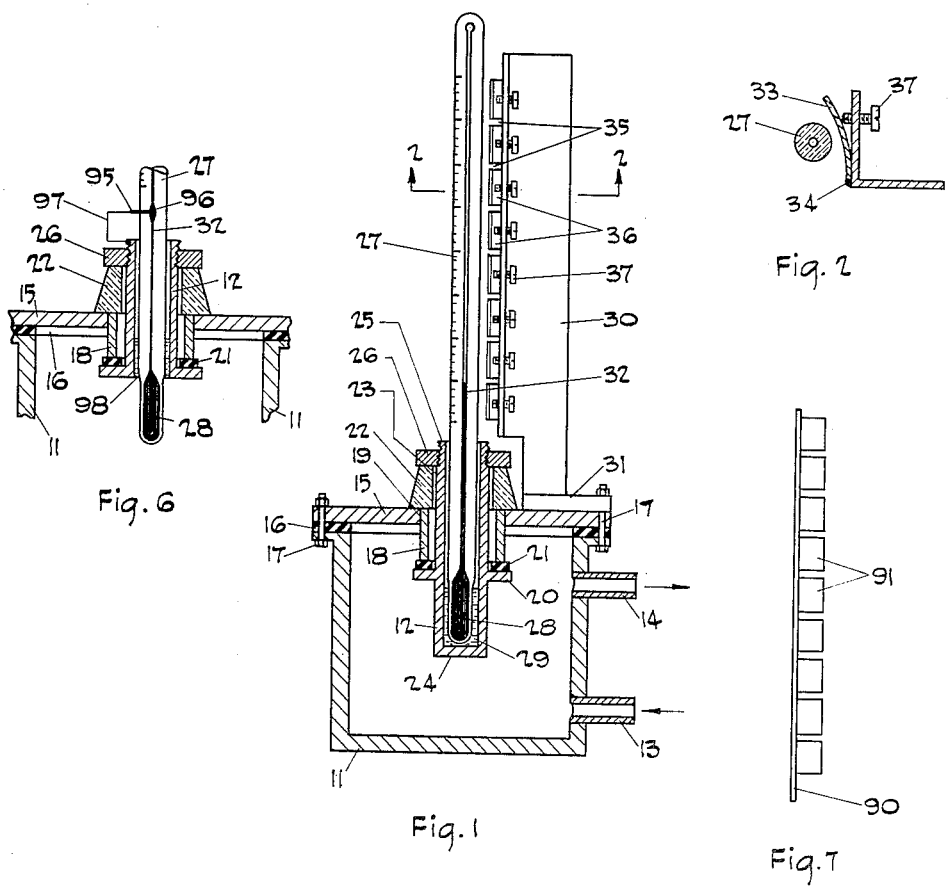
Inventor: Francis B. Rolfson
By His Attorney:

March 11, 1952   F. B. ROLFSON   2,588,882
TEMPERATURE COMPENSATOR FOR CAPACITORS
Filed April 27, 1948   3 Sheets-Sheet 3

Inventor: Francis B. Rolfson
By His Attorney:

Patented Mar. 11, 1952

2,588,882

UNITED STATES PATENT OFFICE 2,588,882

TEMPERATURE COMPENSATOR FOR CAPACITORS

Francis B. Rolfson, San Pablo, Calif., assignor to Shell Development Company, San Francisco, Calif., a corporation of Delaware Application April 27, 1948, Serial No. 23,437

2 Claims. (Cl. 175—183)

The present invention relates to temperature compensators for capacitors or condensers, and pertains more particularly to a temperature compensating condenser in a dielectric constant apparatus and circuit, providing means for counteracting variations in the circuit caused by changes, with temperature, in the dielectric constant of a fluid under test.

Dielectric constant measurements have become increasingly important in recent years. In the chemical laboratory these measurements are useful in the identification of compounds, the control of distillation and reactions, the determination of purity and the measurement of molecular dipole moments.

The dielectric constant of any substance may be defined as the ratio of the capacity of a condenser with that substance between the plates, to the capacity of the same condenser with vacuum between the plates. Most of the present methods of measuring dielectric constants depend on the above concept. Hence a dielectric constant meter for fluids consists essentially of a circuit adapted to measure changes in the capacity of a cell containing the fluid under test.

It is well known, of course, that the dielectric constant of a substance, for example, an organic solvent such as acetone, varies considerably with temperature increases so that the dielectric constant temperature coefficients of the substances may be said to be negative. Therefore, if accurate results are to be obtained, it is necessary to provide means for compensating for such temperature changes or for maintaining at constant temperature the dielectric constant cell containing the substance under test. The latter may be accomplished by surrounding the cell with a water jacket and providing means for circulating a constant temperature fluid therethrough. However, adequate temperature control equipment is both expensive and cumbersome and often more than doubles the cost and bulk of a dielectric constant meter or apparatus.

It is therefore a primary object of the present invention to provide accurate inexpensive and easily portable means for temperature compensation on dielectric constant apparatus.

It is also an object of the present invention to provide temperature compensators for condensers, said compensators being simple and inexpensive in construction and accurate in operation.

These and other objects will be understood from the following description of a preferred embodiment of the apparatus of the present invention, as shown in the accompanying drawings wherein:

Figure 1 is a diagrammatic view, partly in cross section, of a test cell employed in a dielectric constant apparatus.

Figure 2 is a cross-sectional view taken along the line 2—2 in Figure 1.

Figure 6 is a cross-sectional view of another embodiment of a thermometer mounting incorporated in the present invention.

Figure 7 is another embodiment of a temperature compensating condenser plate.

Figure 3:
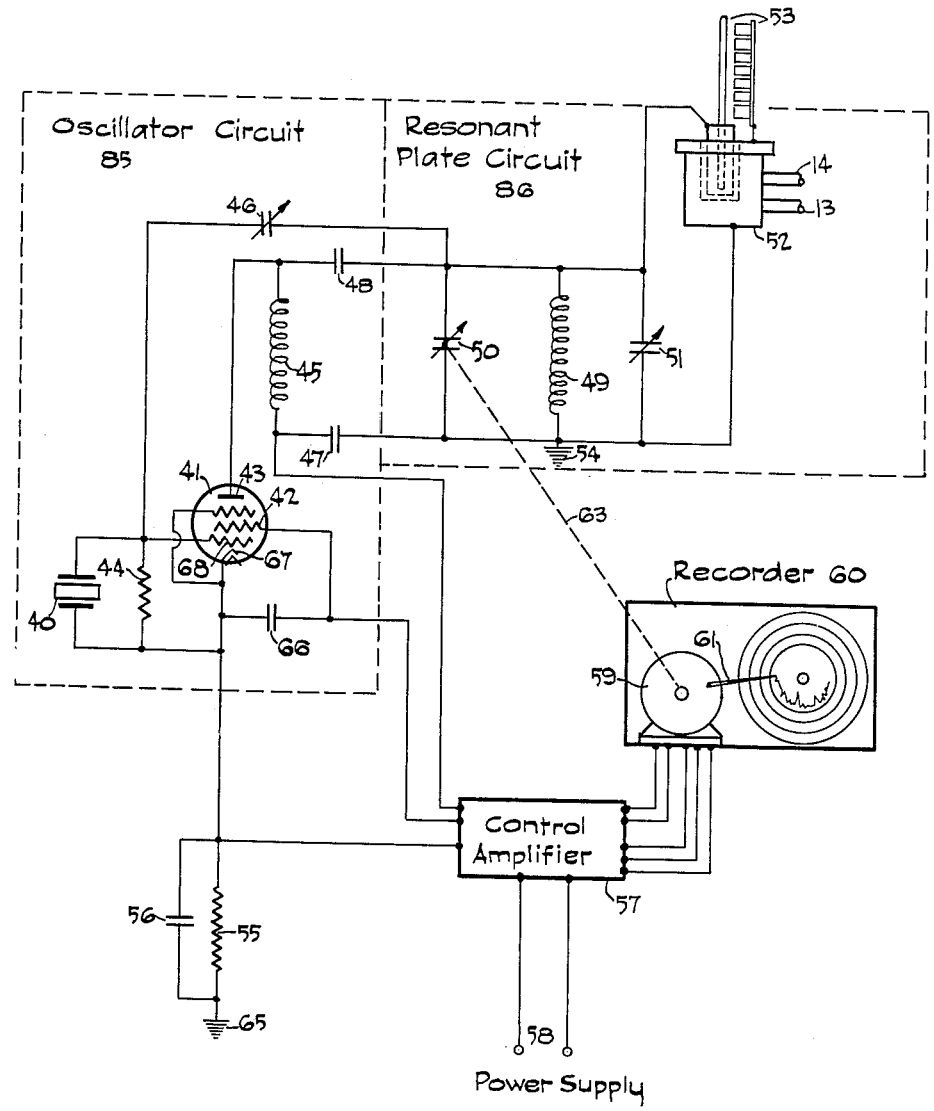
Figure 3 is a schematic diagram of the electrical circuit of a dielectric constant apparatus incorporating the present invention.

Briefly, the dielectric constant apparatus comprises a dielectric constant test cell for the sample to be tested, an electrical circuit adapted to measure changes in capacity of the cell, and temperature compensating means adjacent the test cell for detecting changes of temperature within the cell and effecting corresponding changes in said circuit, whereby a true measurement of the dielectric constant may be obtained.

The dielectric constant test cell is constructed as a condenser adapted to contain a fluid dielectric. Any change in the dielectric constant of a fluid flowing through the cell is readily ascertainable by measuring the change in capacity of the condenser-cell, provided said capacity does not vary with temperature.

As shown in Figure 1, the cell comprises a preferably tubular outer shell or housing member 11, and a preferably tubular inner member 12. These members are insulated from each other and form the outer and inner plates or electrodes, respectively, of the condenser cell. The outer shell 11 has fluid inlet and outlet means 13 and 14, respectively, and is preferably closed at the top by a cover 15. A gasket 16 between said cover 15 and shell 11 forms a fluidtight seal while the cover is secured to the shell in any suitable manner, as by bolts 17.

A short, downwardly extending tubular collar 18 is concentrically positioned in a hole 19 in said cover 15, being fixedly secured thereto in any suitable manner as by welding. Coaxially located within said collar 18 and spaced therefrom is the tubular member 12. An annular flange 20, formed on or fixedly secured to said tubular member 12, has an insulating gasket 21 positioned on its upper surface so that a fluidtight seal is formed when the flange 20 and gasket 21 are drawn up against the lower edge of the collar 18.

A cone-shaped insulator 22 having an axial bore 23 therethrough surrounds the upper portion of tubular member 12, thus cooperating with gasket 21 in effectively insulating said tubular member 12 from the outer shell 11. The lower end 24 of said tubular element 12 is preferably closed while the upper end 25 is outwardly threaded to receive a nut 26. Tightening of the nut 26 causes the tube 12 to be drawn up so that increased pressure is exerted by flange 20 on gasket 21 to form a fluidtight seal. The shell 11 and element 12 may be of any desired shape and having fluid inlet and outlet means positioned in any manner. Since the shell 11 and tubular element 12 form the plates of the condenser-cell, they should be made of a material such as stainless steel, aluminum, copper, etc., and preferably are substantially the same shape.

The tubular element 12 is adapted to receive a mercury thermometer 27 and thus serves as a thermometer well having an inside diameter slightly greater than the diameter of the thermometer 27. The mercury bulb 28 of the thermometer 27 is capacitively coupled to the inner electrode or tubular member 12 of the cell, said capacitive coupling being enhanced preferably by means of a small amount of material 29 having a high dielectric constant such as, for example, glycerine. Use of a material 29 such as glycerine also serves to enhance the thermal conductivity between the mercury bulb 28 and the member 12. While a capacitive coupling between the mercury in the thermometer 27 and the tubular member 12 has proved especially suitable, an electrical connection may be substituted for this coupling if desired. As shown in Figure 6, this electrical connection may comprise a terminal 95 sealed in the wall of the thermometer 27 having one end in contact with the mercury contained in an enlargement 96 in the capillary of the thermometer. The other end of terminal 95 is electrically connected by a lead 97 to the tubular member 12 of the cell, thus electrically connecting the mercury thread 32 to said inner member 12. In this same embodiment the tubular member 12 may be open at its lower end 24. The thermometer 27 may then be sealed therein in a fluidtight manner with any suitable sealing compound 98 whereby the bulb 28 is immersed directly in the fluid flow stream.

A vertical bar member 30, having a base plate 31, is secured to the cover 15 and electrically connected to said cover 15 and shell 11, or outer electrode of the cell, by means of bolts 17. This bar member 30, in conjunction with the mercury thermometer 27, forms the temperature compensator of the present invention. The vertical bar member 30 is positioned in parallel spaced relationship with the thermometer 27 adjacent thereto. Thus, bar member 30 and the mercury thread 32 of the thermometer 27 form the plates of a condenser with a dielectric between them consisting of air and the glass of the thermometer. As the temperature in the cell is increased, the mercury in the thermometer 27, measuring the temperature in the cell, is caused to expand which causes the mercury thread 32 to rise thus increasing the effective area of the condenser plates and hence the capacity of this temperature-compensating condenser. Therefore, the capacity of the condenser-cell (formed by the shell 11 and the member 12), which may be said to be in parallel with the temperature-compensating condenser, is increased in an amount sufficient to offset any decrease in capacity of the cell due to an increase in the temperature of the fluid dielectric therein.

Preferably the bar member 30 comprises a plurality of segments that are individually adjustable in a horizontal plane, either towards or away from the vertical thermometer 27. As shown in Figures 1 and 2 the bar member 30 may be in the form of an angle-iron having a flexible metal strip 33 attached to the side adjacent the thermometer 27. The strip 33 may be secured to the bar 30 in any suitable manner, as by welding at 34. A plurality of slots 35 in said strip 33 divide it into a plurality of flexible segments 36. Opposite each segment 36, a hole (not shown) is drilled and tapped in bar member 30 to receive a screw 37. Thus, by adjusting the position of the screws the distances between the segments 36 and the thermometer 27 may be set as desired. While this adjustable means is shown as a slotted strip 33, it is realized that it may be in many other suitable forms, such as, for example, a single strip with means for adjusting it or a vertical rod 90 having a plurality of horizontally adjustable metallic flags 91 on it, as shown in Figure 7.

The resulting temperature compensator is a temperature sensitive condenser or capacitor whose magnitude and linearity of response are adjustable and stable. The speed of response of such a temperature compensator is quite rapid, being limited only by the time constant of the thermometer. A substantial lag in the temperature compensator condenser may be overcome by removing the thermometer 27 and bar member 30 from their normal position in and adjacent the condenser-cell and inserting the thermometer in the fluid flow stream upstream from the cell. The bar member 30 would then be mounted adjacent it. This gives the temperature compensator time to start responding so that it accurately corrects for temperature variations in the fluid at the moment it is flowing through the cell. If the thermometer 27 and bar member 30 are not perfectly parallel, or if the thermometer varies in thickness, the linearity of a dielectric constant versus temperature curve is affected, thus indicating that inaccurate dielectric constant values would be obtained from a direct reading of the apparatus. These errors can be compensated for and eliminated by adjusting the spacings of the individual segments 36 with relation to the thermometer 27.

An electrical circuit for measuring changes in the capacity of the cell of Figure 1, is schematically shown in Figure 3 of the drawing. This circuit comprises essentially an oscillator circuit 85, a resonant plate circuit 86, a controlled amplifier 57, and a recorder 60 having a reversible motor 59. The necessary operating current is supplied to all of these component parts from a power supply shown at terminals 58.

The crystal controlled oscillator circuit comprises a crystal 40 and a tube 41 having a grid 68, plate 43 and cathode 67. The tube 41 is preferably a pentode, as shown in the drawing. A grid leak resistor 44 provides a grid return to the cathode 67 of the tube 41. A choke coil 45 provides the necessary voltage to the plate 43 of the tube 41 and at the same time presents a high impedance to the A. C. component of the plate voltage. A feed-back condenser 46 feeds voltage from the plate circuit to the grid circuit. A by-pass condenser 47 provides a low impedance path for the oscillations from the resonant plate circuit. A plate blocking condenser 48 links the plate 43 of the tube 41 with the resonant plate circuit. A screen by-pass condenser 66 is placed between the screen grid 42 and the cathode 67 of the tube 41.

The resonant plate circuit of the crystal controlled oscillator comprises an inductance 49, a variable measuring condenser 50, a variable trimmer condenser 51, the dielectric constant test cell 52 and the temperature-compensating element or condenser 53, all being electrically connected together in parallel and grounded at 54.

The cathode of the oscillator is grounded through a resistor 55 and a parallel by-pass condenser 56. The potential drop across said resistor provides a voltage for the control amplifier 57, said voltage being proportional to the oscillator cathode current. This current is normally constant when no change takes place in the dielectric constant of the substance in the cell 52 under test.

The control amplifier is electrically connected to operate a reversible motor 59 which is, in turn, mechanically linked to the pen 61 of a recorder 60. The reversible motor 59 is also mechanically linked in any suitable manner to the variable measuring condenser 50, this linkage being represented by a broken line 63.

Figure 5:
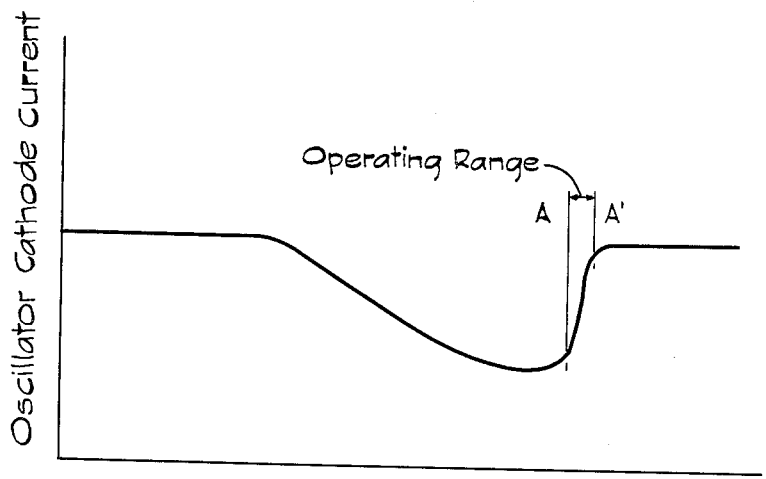
Figure 5 is a curve illustrating the cathode or plate current characteristic of a crystal controlled oscillator.

The principle upon which the apparatus is based involves the cathode current characteristics of a crystal controlled oscillator at its resonance point. As shown in Figure 5, if the oscillator cathode current is plotted against the capacity of the resonant circuit, it will be seen from the curve obtained that in one section A—A' of the curve, a large change in cathode current occurs for a relatively small change in the capacity of the resonant circuit at its resonance point, that is, for a certain narrow range of values A—A' of the total capacity of said resonant circuit. Therefore, by measuring the changes in the cathode current at or near said point, very small changes in the dielectric constant of a substance under test may be obtained.

In using the dielectric constant apparatus of the present invention to record changes in a continuously flowing fluid stream, the fluid is run into and out of the condenser-test cell through inlet 13 and outlet 14, respectively, so that the exposed portion of the inner electrode or tubular member 12 is preferably completely covered with the fluid under test. If the tubular member 12 is not completely covered, the height of the fluid in the cell must be maintained at a constant level in order to obtain comparable capacity readings. A varying height of fluid in the cell will cause undesirable changes in the capacity thereof.

With power applied to the crystal controlled oscillator and its resonant circuit, the variable trimmer condenser 51 (Figure 3) is adjusted to add sufficient capacity to that of the test cell 52 and temperature compensator 53 to bring the resonance of the circuit within the desired range so as to permit the use of the variable condenser 50 for measuring and balancing any changes in the circuit.

When the apparatus has thus been adjusted and balanced, the oscillator cathode current remains constant when there is no change in dielectric constant of the substance in the test cell 52. When such a change occurs in the cell, the oscillator cathode current immediately changes, becoming greater or smaller. A change in the cathode current causes a corresponding change in the voltage across the cathode resistor 55 which is amplified by control amplifier 57 so as to drive reversible motor 59 in one direction or the other. The motor, being mechanically linked to the variable measuring condenser 50 automatically changes the setting of said condenser 50 in the proper direction, thereby tuning or re-balancing the oscillator for constant cathode current. The recorder 60 being geared to the motor, thus records any changes in the capacity of the circuit, and hence measures any changes in the dielectric constant of the material in the test cell 52. Thus, if the capacity of the test cell 52 should decrease, the follow-up system (amplifier 57, motor 59 and variable measuring condenser 50) would increase the capacity of condenser 50 to maintain the same total capacity in the resonant circuit, i. e. across the inductance 49.

Without a temperature compensator 53 in the circuit, any increase in temperature of the fluid under test would cause a change in the capacity of the test cell and a corresponding change in the dielectric constant reading thus indicating a possible change in the composition of the fluid under test. Actually the change might be entirely due to change in temperature.

With the present apparatus incorporating a temperature compensator, any increase in temperature decreases the capacity of the test cell 52, but at the same time the capacity of the temperature compensator is increased an equal and proportional amount as the rising mercury in the thermometer forms a condenser plate of increasing area, thereby maintaining the system in balance. Hence, no change in dielectric constant of the fluid is indicated with a change in temperature. Thus, only a change in dielectric constant due to a change in composition, and not to temperature is accurately indicated and recorded.

Figure 4:
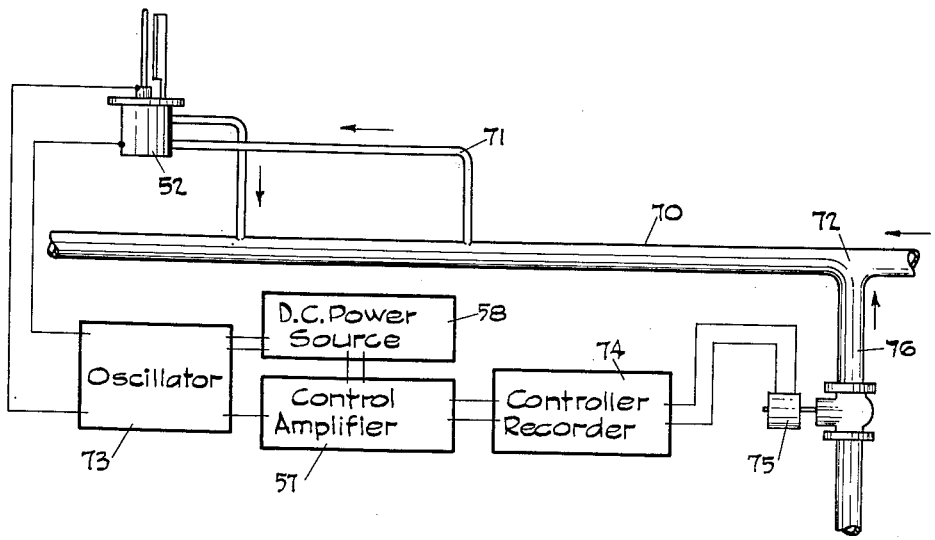
Figure 4 is a diagrammatic view of a dielectric constant apparatus according to the present invention which is electrically connected to means for measuring a change in dielectric constant and utilizing it to operate flow controlling means.

A dielectric constant apparatus according to the present invention has many industrial applications. It may be used to detect small quantities of a contaminating substance, such as water in the manufacture of acetone or other organic fluids. It may also be used to control the distillation rate of various products by maintaining the distillation product at a certain dielectric constant value. As diagrammatically shown in Figure 4, the accurate mixing of two fluids in a flow line 70 may be controlled by measuring the dielectric constant of the fluid in a test cell 52 positioned in the pipe line 70, or in a by-pass 71 thereof, downstream of the mixing point 72. The test cell 52, oscillator 73, control amplifier 57 and D.-C. power source 58 are electrically connected to a suitable controller-recorder 74 which is adapted to actuate and reset any suitable flow controlling means, such as a solenoid valve 75, in one product line 76 upstream of the mixing point 72.

While the temperature compensator of the present invention has been described hereinabove with regard to a dielectric constant apparatus, it is not intended to limit the scope of this invention to its use with the condensers of such an apparatus. The temperature compensator of the present invention may be suitably connected to any other condenser or capacitor and serve as means for correcting for changes in the capacity of said condensers that are due to fluctuations of temperature therein.

Preferably, the sensitivity of any compensator should be equal to that of the condenser for which it is making temperature corrections, that is, the change in capacity per degree change in temperature should be the same for both the compensator and the attached condenser. However, the change in capacity of the compensator and the condenser must be equal and opposite, i. e. the capacity of the compensator must increase as the capacity of the condenser decreases. Sensitivity of the temperature compensator may be adjusted to the desired value by use of a thermometer 27 (Figure 1) of substantially the necessary sensitivity and by horizontal adjustment of the segments 36 of the metallic strip 33 adjacent the thermometer. It is also realized that more than one thermometer or more than one compensator per condenser may be used if desired.

I claim as my invention:

1. In a system for measuring the dielectric constant of a fluid, a condenser having an outer and an inner concentric cylindrical plates, said plates being electrically insulated and spaced from each other to form a condenser cell adapted to receive a dielectric fluid between said plates, a mercury column type thermometer having its mercury bulb end inserted within the inner cylindrical plate in capacitative coupling therewith, an elongated metallic compensator bar member rigidly affixed and electrically connected to the outer cylindrical plate, said compensator bar being mounted in parallel relationship and closely adjacent to said thermometer, lateral adjusting means on said compensator for regulating the amount of capacitative coupling between said compensator and said mercury column, and means for connecting said two plates to terminals of opposite polarity.

2. A temperature-compensating condenser apparatus comprising two plate elements adapted to receive a fluid dielectric therebetween, a thermometer comprising an expansible mercury column capacitatively coupled with one of said plates and in thermal communication with said dielectric fluid, an elongated metallic bar member rigidly affixed and electrically connected to the other plate, said bar member being closely adjacent and substantially parallel to said thermometer, a plurality of adjusting members laterally movable with regard to said compensator for regulating the amount of capacitative coupling between said compensator and said mercury column, whereby the total capacity of the condenser apparatus is maintained substantially constant by changes in the amount of capacitative coupling between said bar member and said mercury column caused by temperature-responsive changes in the length of said mercury column, said changes being sufficient for substantially offsetting changes in the total capacity of the condenser caused by temperature-responsive changes in the dielectric constant of said fluid, and means for connecting said two plates to terminals of opposite polarity.

FRANCIS B. ROLFSON.

REFERENCES CITED

The following references are of record in the file of this patent:

UNITED STATES PATENTS

| Number | Name | Date |
|---|---|---|
| 1,450,023 | Edelman | Mar. 27, 1923 |
| 1,472,125 | Keeler | Oct. 30, 1923 |
| 1,976,904 | Terman | Oct. 16, 1934 |
| 2,071,607 | Bjorndal | Feb. 23, 1937 |
| 2,081,914 | Dow | June 1, 1937 |
| 2,097,100 | Linsell | Oct. 26, 1937 |
| 2,222,221 | Burford | Nov. 19, 1940 |
| 2,266,114 | Bartlett | Dec. 16, 1941 |
| 2,297,346 | Crist | Sept. 29, 1942 |
| 2,365,706 | Keinath | Dec. 26, 1944 |
| 2,456,117 | Feller | Dec. 14, 1948 |
| 2,485,579 | Elliot | Oct. 25, 1949 |